United States Patent
Wang et al.

(10) Patent No.: US 10,747,024 B2
(45) Date of Patent: Aug. 18, 2020

(54) WIDE-ANGLE CAMERA FOR HEAD-MOUNTED DEVICE, AND HEAD-MOUNTED DEVICE

(71) Applicant: Qingdao GoerTek Technology Co., Ltd., Qingdao (CN)

(72) Inventors: Yuanpeng Wang, Qingdao (CN); Chun Yang, Qingdao (CN)

(73) Assignee: Qingdao GoerTek Technology Co., Ltd., Qingdao (CN)

( * ) Notice: Subject to any disclaimer, the term of this patent is extended or adjusted under 35 U.S.C. 154(b) by 260 days.

(21) Appl. No.: 15/855,380

(22) Filed: Dec. 27, 2017

(65) Prior Publication Data

US 2018/0120591 A1 May 3, 2018

Related U.S. Application Data

(63) Continuation of application No. 15/322,341, filed as application No. PCT/CN2015/082072 on Jun. 23, 2015, now Pat. No. 9,952,450.

(30) Foreign Application Priority Data

Jun. 28, 2014 (CN) .......................... 2014 1 0300498

(51) Int. Cl.
*G02C 7/00* (2006.01)
*G02C 7/06* (2006.01)
(Continued)

(52) U.S. Cl.
CPC .............. *G02C 7/068* (2013.01); *G02B 7/04* (2013.01); *G02B 13/18* (2013.01); *G02B 25/001* (2013.01);
(Continued)

(58) Field of Classification Search
CPC .......... G02C 7/068; G02C 11/10; G02C 3/02; G02C 7/06; G02C 7/061; G02C 7/063;
(Continued)

(56) References Cited

U.S. PATENT DOCUMENTS 4,740,884 A 4/1988 Shiho et al.
5,479,224 A 12/1995 Yasugaki et al.
(Continued)

FOREIGN PATENT DOCUMENTS

CN 101231379 A 7/2008
CN 101644822 A 2/2010
(Continued)

OTHER PUBLICATIONS

WayBack Machine, Wikipedia, Sep. 15, 2011.
(Continued)

*Primary Examiner* — William R Alexander
*Assistant Examiner* — Henry A Duong
(74) *Attorney, Agent, or Firm* — LKGlobal | Lorenz & Kopf, LLP

(57) ABSTRACT

A wide-angle camera for a head-mounted device, includes, but is not limited to, a casing, a biconvex plus lens, and a biconcave minus lens. The biconvex plus lens and the biconcave minus lens are arranged in parallel in the casing and the biconcave minus lens is closer to an object space. The bioconcave minus lens is able to move along an axis of the casing to adjust a distance to the bioconvex plus lens. The focal power of a zooming system of the wide-angle camera is set to be a range from −0.005 to 0.005, an thus the bioconvex plus lens is stationary in the camera, and a movement of the bioconcave minus lens enables the camera to be suitable for the crowds of 500 degree nearsightedness to 500 degree farsightedness.

18 Claims, 14 Drawing Sheets

(51) Int. Cl.
  *G02B 25/00* (2006.01)
  *G02B 7/04* (2006.01)
  *G02B 27/01* (2006.01)
  *G02B 13/18* (2006.01)
  *G02C 3/02* (2006.01)
  *G02C 11/00* (2006.01)
  *G02B 13/00* (2006.01)

(52) U.S. Cl.
  CPC .......... *G02B 27/0172* (2013.01); *G02C 3/02* (2013.01); *G02C 11/10* (2013.01); *G02B 13/003* (2013.01); *G02B 13/009* (2013.01)

(58) Field of Classification Search
  CPC .... G02C 7/065; G02C 7/066; G02B 27/0172; G02B 7/04; G02B 25/001; G02B 13/18; G02B 13/009; G02B 13/003; G02B 27/01; G02B 15/20; G02B 3/00; G02B 3/02; G02B 3/04; G02B 3/06; G02B 3/08; G02B 9/04; G02B 9/06; G02B 9/08; G02B 9/10; G02B 9/12; G02B 9/14; G02B 9/16; G02B 9/18; G02B 9/20; G02B 9/22; G02B 9/24; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/62; G02B 9/64; G02B 13/0035; G02B 13/004; G02B 13/0045; G02B 13/005; G02B 9/00; G02B 9/02; G02B 13/00; G02B 13/002
  USPC .................... 359/708, 793, 717; 351/159.41
  See application file for complete search history.

(56) References Cited

U.S. PATENT DOCUMENTS

| | | | |
|---|---|---|---|
| 5,539,576 | A | 7/1996 | Ito |
| 6,236,515 | B1 | 5/2001 | Yamamoto et al. |
| 8,730,586 | B2 | 5/2014 | Eguchi |
| 8,792,183 | B2 | 7/2014 | Chou |
| 2011/0249170 | A1 | 10/2011 | Tsai |
| 2013/0235331 | A1 | 9/2013 | Heinrich et al. |
| 2013/0250438 | A1* | 9/2013 | Hsieh .................. G02B 13/003 359/708 |
| 2014/0153102 | A1 | 6/2014 | Chang |

FOREIGN PATENT DOCUMENTS

| | | |
|---|---|---|
| CN | 103605209 A | 2/2014 |
| CN | 103852874 A | 6/2014 |
| CN | 104090354 A | 10/2014 |
| CN | 204116696 U | 1/2015 |
| JP | 10-142505 A | 5/1998 |
| JP | 2009-210656 A | 9/2009 |
| WO | 2006110009 A1 | 10/2006 |
| WO | 2009014256 A1 | 1/2009 |

OTHER PUBLICATIONS

USPTO, Office Action in U.S. Appl. No. 15/322,341 dated Jul. 27, 2017.
USPTO, Notice of Allowance and Fee(s) Due in U.S. Appl. No. 15/322,341 dated Dec. 20, 2017.
Chinese Patent Office, Office Action in CN Patent Application No. 201410300498.3 dated Dec. 3, 2015.
European Patent Office, Office Action in EP Patent Application No. 15812630.0 dated Jun. 2, 2017.
European Patent Office, Office Action in EP Patent Application No. 15812630.0 dated Feb. 20, 2018.
European Patent Office, Office Action in EP Patent Application No. 15812630.0 dated Aug. 31, 2018.
European Patent Office, Search Report in EP Patent Application No. 15812630.0 dated Apr. 3, 2017.
Japanese Patent Office, Office Action in JP Patent Application No. 2016-576094 dated Jun. 23, 2017.
Korean Patent Office, Office Action in KR Patent Application No. 10-2017-7002530 dated Jun. 21, 2017.
Korean Patent Office, Office Action in KR Patent Application No. 10-2017-7002530 dated Dec. 1, 2017.
Australian Patent Office, Office Action in AU Patent Application No. 2015281503 dated Jan. 25, 2017.
Canadian Patent Office, Office Action in CA Patent Application No. 2953811 dated Nov. 27, 2017.
European Patent Office, Communication pursuant to Article 94(3) EPC, dated Feb. 28, 2019.
Gross H Et—Gross H: Handbook of Optical Systems, Chromatic Aberrations, 2007, Handbook of Optical Systems, Aberration Theory and Correction of Optical Systems, Wiley-VCH, Weinheim, DE, pp. 268-289, XP002619942, ISBN: 978-3-527-40379-0.

* cited by examiner

| Active : 1/7 | Config 1* | Config 2 | Config 3 | Config 4 | Config 5 | Config 6 | Config 7 |
|---|---|---|---|---|---|---|---|
| PAR1 | 1 | 0.000 | 800.000 | 400.000 | 200.000 | -200.000 | -400.000 | -800.000 |
| THIC | 3 | 5.990 V | 5.323 V | 4.666 V | 3.359 V | 8.652 V | 7.313 V | 6.646 V |
| TSP2 | 5 | 65.520 V | 65.520 P | 65.520 P | 65.520 P | 65.520 P | 65.520 P | 65.520 P |

FIGURE 27

WIDE-ANGLE CAMERA FOR HEAD-MOUNTED DEVICE, AND HEAD-MOUNTED DEVICE

CROSS REFERENCE TO RELATED APPLICATIONS

This is a continuation of U.S. application Ser. No. 15/322,341, filed Dec. 27, 2016, which was the U.S. National-Stage application of International Application No. PCT/CN2015/082072, filed Jun. 23, 2015 which was published under PCT Article 21(2) and which claims priority to Chinese Patent Application No. 201410300498.3, filed Jun. 28, 2014, the entire contents of which are hereby incorporated herein by reference.

TECHNICAL FIELD

This Application pertains to a wide-angle camera for a head-mounted device, and a head-mounted device, which are applied to the field of consumer electronics.

BACKGROUND

For head-mounted display devices, a large viewing field angle can enhance the sense of immersion and thus improve the entertainment effect. However, the field curvature and the magnification chromatic difference caused by the increase of the viewing field angle will seriously affect the system imaging quality. The conventional eyepiece system requires a lot of lenses to correct the aberration, and conventional optical glasses have a high weight, which increases the burden of head-mounted devices on human body. Thus, the eyepieces of the head-mounted systems with a large viewing field need a more novel and simple design.

In addition, for crowds of nearsightedness or farsightedness, the current fully-fixed head-mounted system cannot meet their demands, because when not wearing glasses, the user will feel that the image is blurry due to the nearsightedness or farsightedness. Although the defocus relative to the retina caused by nearsightedness or farsightedness can be compensated for when the glasses are worn, it is not convenient or comfortable. In addition, other objects, desirable features and characteristics will become apparent from the subsequent summary and detailed description, and the appended claims, taken in conjunction with the accompanying drawings and this background.

SUMMARY

In order to solve the problem that the existing wide-angle cameras for head-mounted devices are heavy and not suitable to be used by the users of nearsightedness or farsightedness, this Application proposes a wide-angle camera for a head-mounted device, which is implemented with the following technical solutions:

A wide-angle camera for a head-mounted device, comprising a casing, a biconvex plus lens, and a biconcave minus lens, wherein the biconvex plus lens and the biconcave minus lens are arranged in parallel in the casing and the biconcave minus lens is closer to an object space; the biconcave minus lens is able to move along an axis of the casing to adjust a distance to the biconvex plus lens, a focal power of zooming system of the wide-angle camera is set to be a range from −0.005 to 0.005, and thus the biconvex plus lens is stationary in the camera, and a movement of the biconcave minus lens enables the camera to be suitable for the crowds of 500 degree nearsightedness to 500 degree farsightedness.

Further, the biconvex plus lens comprises a first surface that is convex toward the object space, and a second surface that has a flat edge and a center position that is convex toward an image space, the biconcave minus lens comprises a third surface that is concave toward the image space, and a fourth surface that has a flat edge and a center position that is concave toward the object space; and lens surfaces of the biconvex plus lens and the biconcave minus lens are both aspheric surfaces.

Further, the biconvex plus lens has a refractive index ranging from 1.45-1.70, and a chromatic dispersion ranging from 50-75.

Further, the biconcave minus lens has a refractive index ranging from 1.45-1.75, and a chromatic dispersion ranging from 25-40.

Further, the biconvex plus lens is made of a plastic material, with n1=1.53160 and v1=56.04 wherein n1 is a refractive index, and v1 is a chromatic dispersion.

Further, the biconcave minus lens is made of a plastic material, with n1=1.5585470 and v1=29.91, wherein n1 is a refractive index, and v1 is a chromatic dispersion.

Further, the third surface is an aspheric surface having an indefinitely large curvature radius.

Further, surface shapes of the first surface, the second surface, the third surface and the fourth surface follow a formula:

$$Z = \frac{cY^2}{1+\sqrt{1-(1+k)c^2Y^2}} + \sum_{i=1}^{N} \alpha_i Y^{2i}$$

wherein, Z is a coordinate in an optical axis direction, Y is a radial coordinate in the unit of a lens length unit, c is a curvature, k is a conical coefficient, $\alpha_i$ is a coefficient of each high order term, 2i is an aspheric high order power, and N is a natural number.

In another non-limiting embodiment, a head-mounted device, comprising a wide-angle camera for a head-mounted device is disclosed. The wide-angle camera for a head-mounted device, includes, but is not limited to, a casing. The wide-angle camera further includes, but is not limited to, a biconvex plus lens. The wide-angle camera further includes, but is not limited to, a biconcave minus lens. The biconvex plus lens and the biconcave minus lens are arranged in parallel in the casing and the biconcave minus lens is closer to an object space. The biconcave minus lens is able to move along an axis of the casing to adjust a distance to the biconvex plus lens. A focal power of a zooming system of the wide-angle camera is set to be a range from −0.005 to 0.005, and thus the biconvex plus lens is stationary in the camera, and a movement of the biconcave minus lens enables the camera to be suitable for the crowds of 500 degree nearsightedness to 500 degree farsightedness.

The design of this Application adds a minus lens on the basis of the plus lens. The minus lens has three functions: compensating for the chromatic difference of the system, correcting the Petzval field curvature, and achieving zooming correction of nearsightedness and farsightedness. Defocus relative to the retina caused by nearsightedness or farsightedness can be compensated for by reasonably introducing aspheric collocations to distribute the focal power. In the embodiments, the defocus is compensated for in a zooming manner, so that the crowds of nearsightedness or farsightedness can use the head-mounted device with naked eyes, which satisfies different persons from 500 degree nearsightedness to 500 degree farsightedness. In use, a person can adjust the focal length according to his degree of nearsightedness or farsightedness to achieve a clear imaging without changing the conjugated distance between the human eyes and the screen. By using the plastic lens and introducing the aspheric surface, the system is more lightweighted. The design of this Application corrects the magnification chromatic difference, and achieves a good imaging quality.

BRIEF DESCRIPTION OF THE DRAWINGS

The present invention will hereinafter be described in conjunction with the following drawing figures, wherein like numerals denote like elements, and:

FIG. 27 is the diagram of the positional relations between the plus lens and the minus lens at different focal lengths of this Application.

Figure 1:
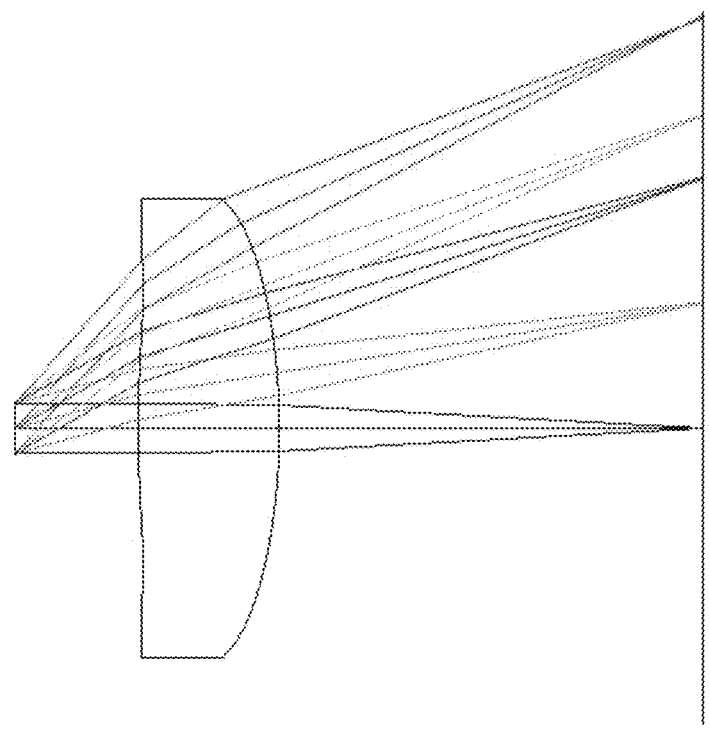
FIG. 1 illustrates the lens structure of a single lens without chromatic difference correction, and the optical path diagram thereof.

In the Drawings, a biconvex plus lens is generally designated by the reference numeral 1; a biconcave minus lens is generally designated by the reference numeral 2; a first surface is generally designated by the reference numeral 3; a second surface is generally designated by the reference numeral 4; a third surface is generally designated by the reference numeral 5; and a fourth surface is generally designated by the reference numeral 6.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

The design of this Application adds a minus lens on the basis of the plus lens, and the minus lens has three functions: compensating for the chromatic difference of the system, correcting the Petzval field curvature, and achieving zooming correction of nearsightedness and farsightedness.

Figure 17:
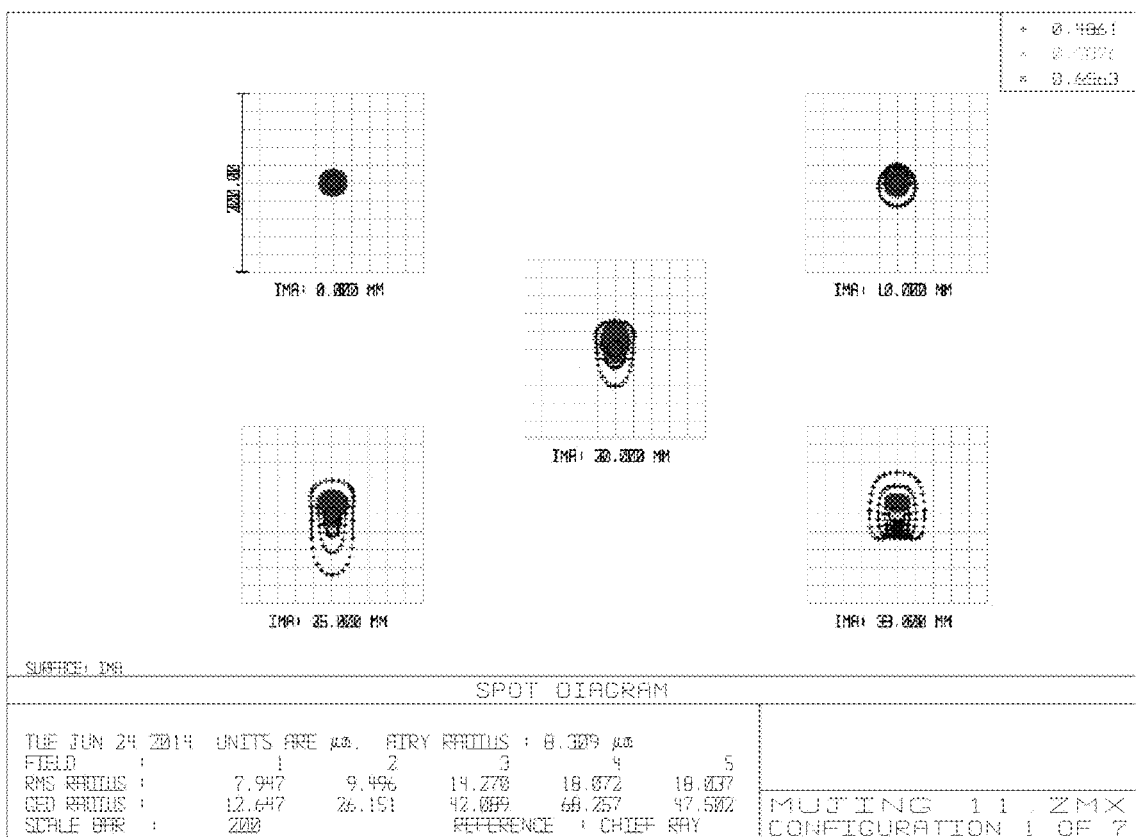
FIG. 17 is the point column diagram when the camera of this Application is suitable for normal eyesight.
Figure 18:
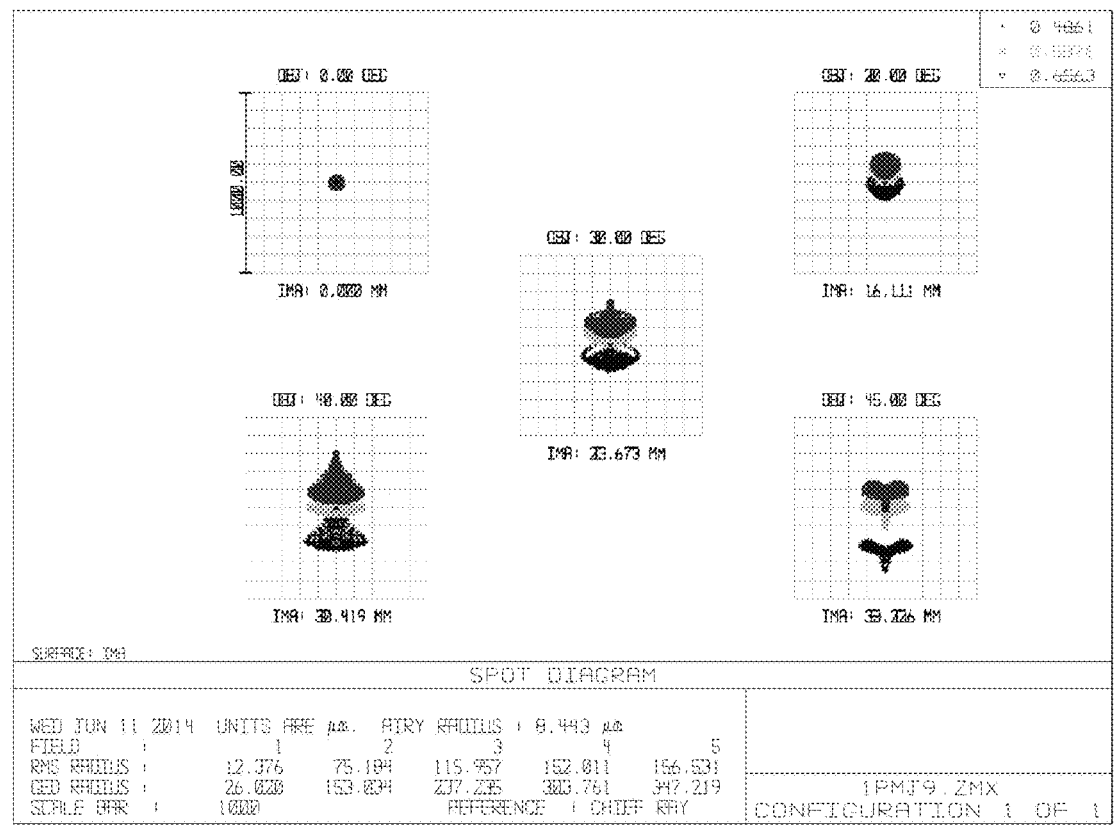
FIG. 18 is the point column diagram for FIG. 1.
Figure 19:
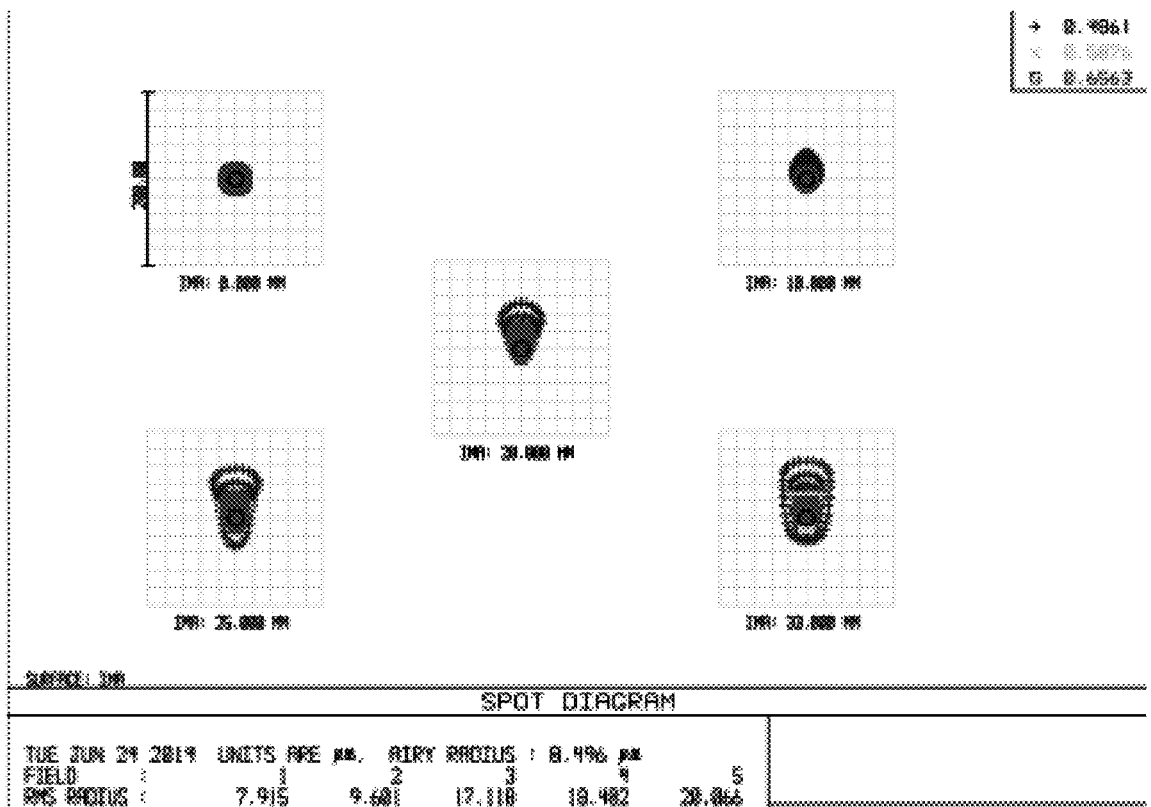
FIGS. 19-24 are the point column diagrams one-to-one corresponding to the lens structures as illustrated in FIGS. 3-8.
Figure 20:
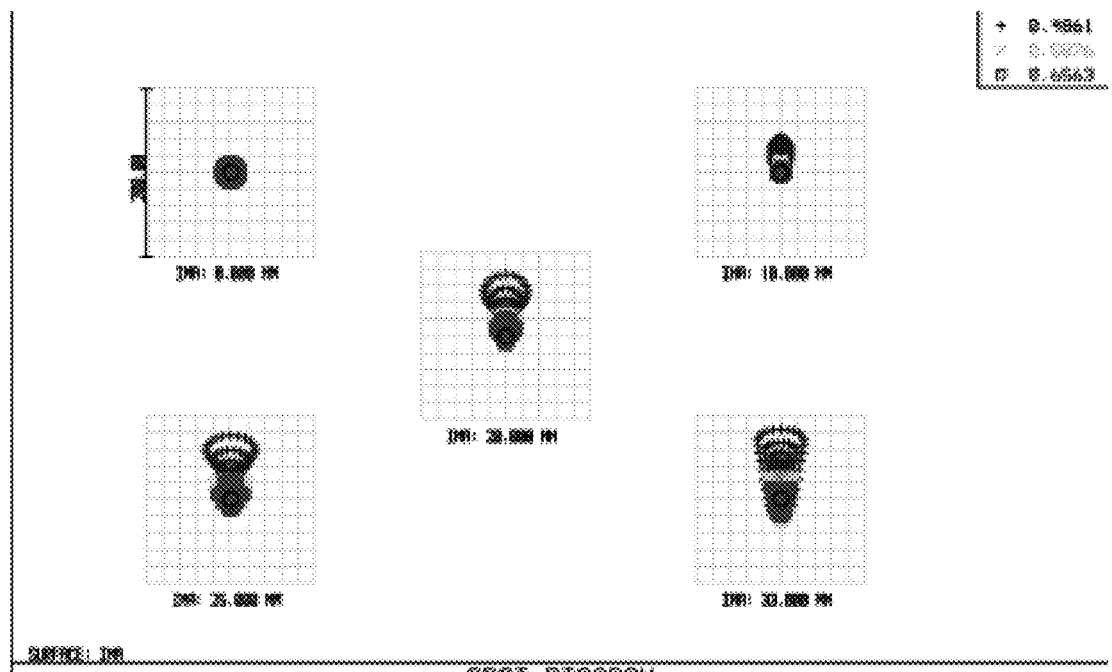
Figure 21:
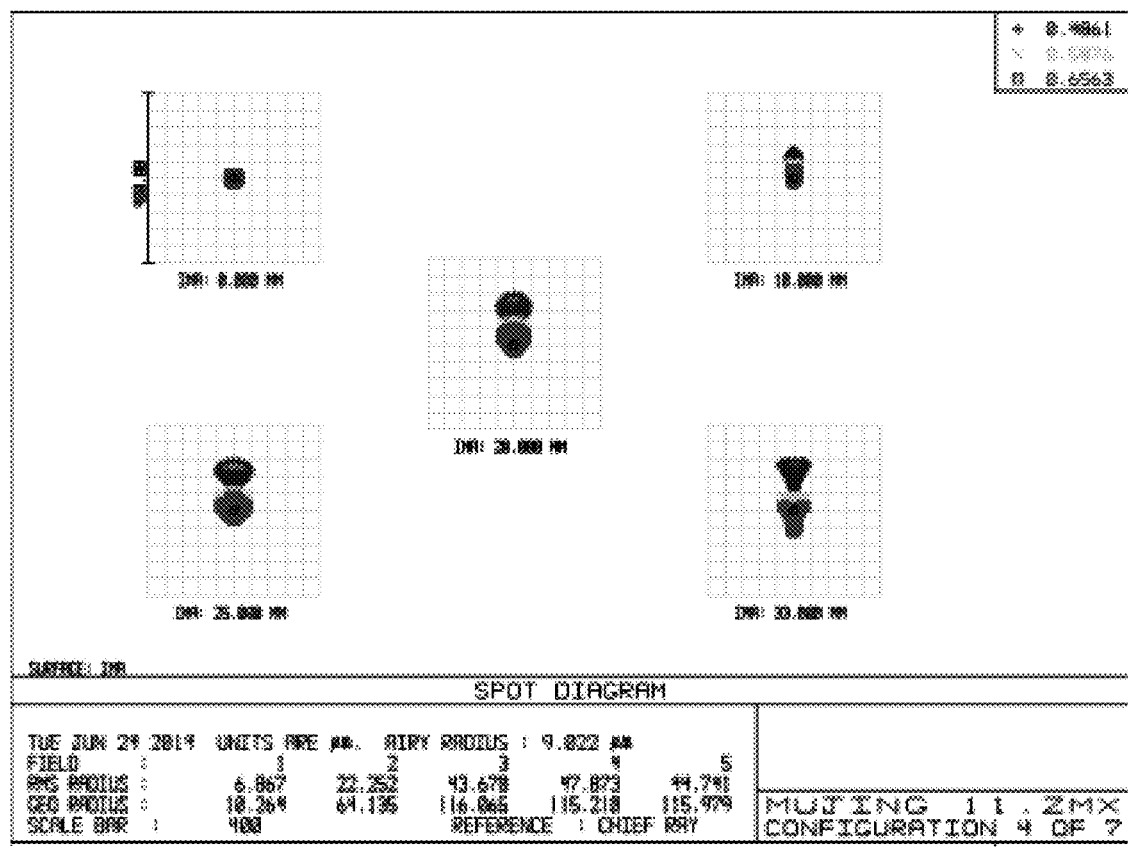
Figure 22:
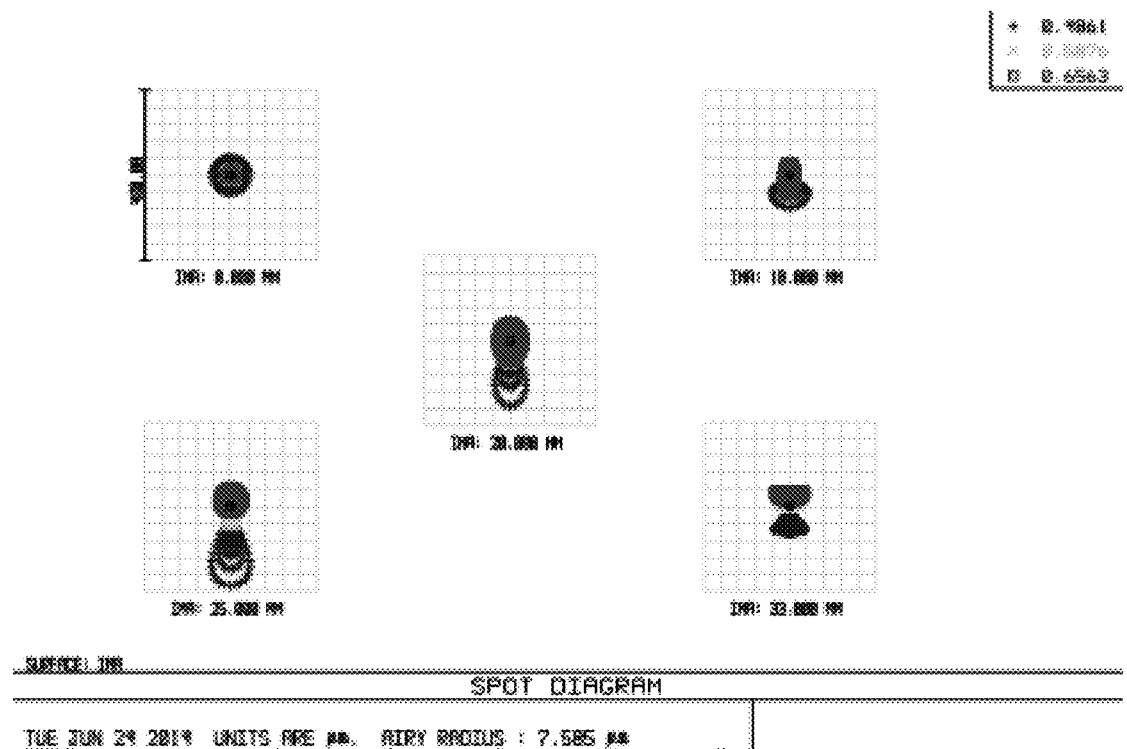
Figure 23:
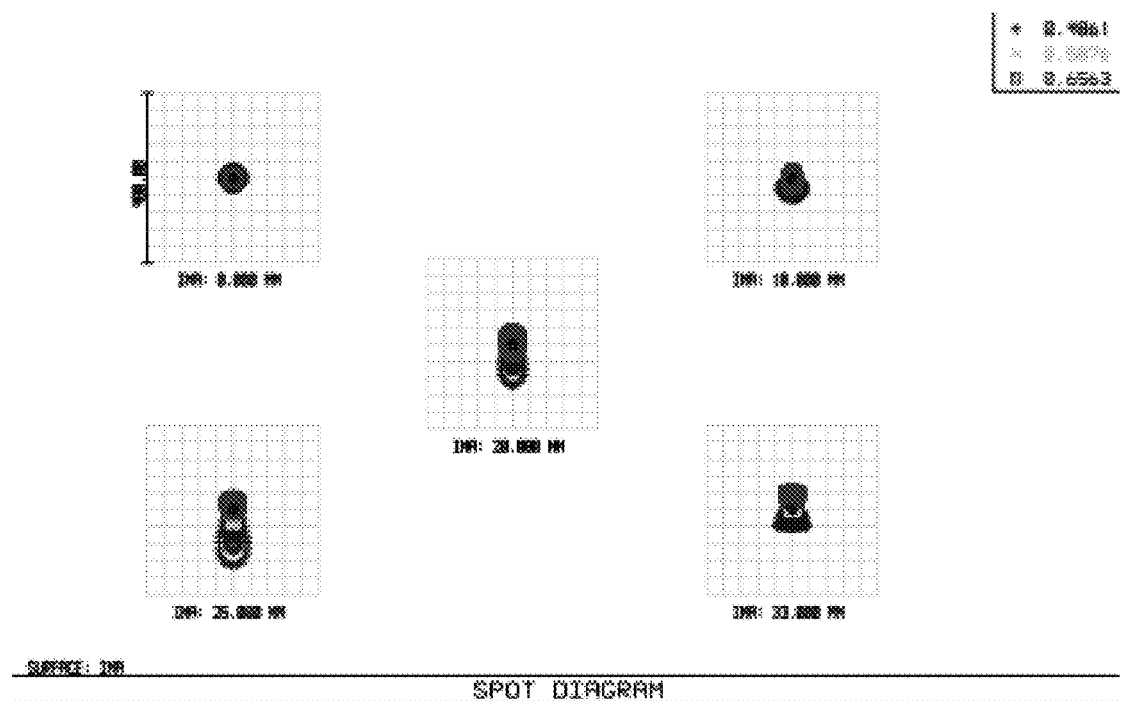
Figure 24:
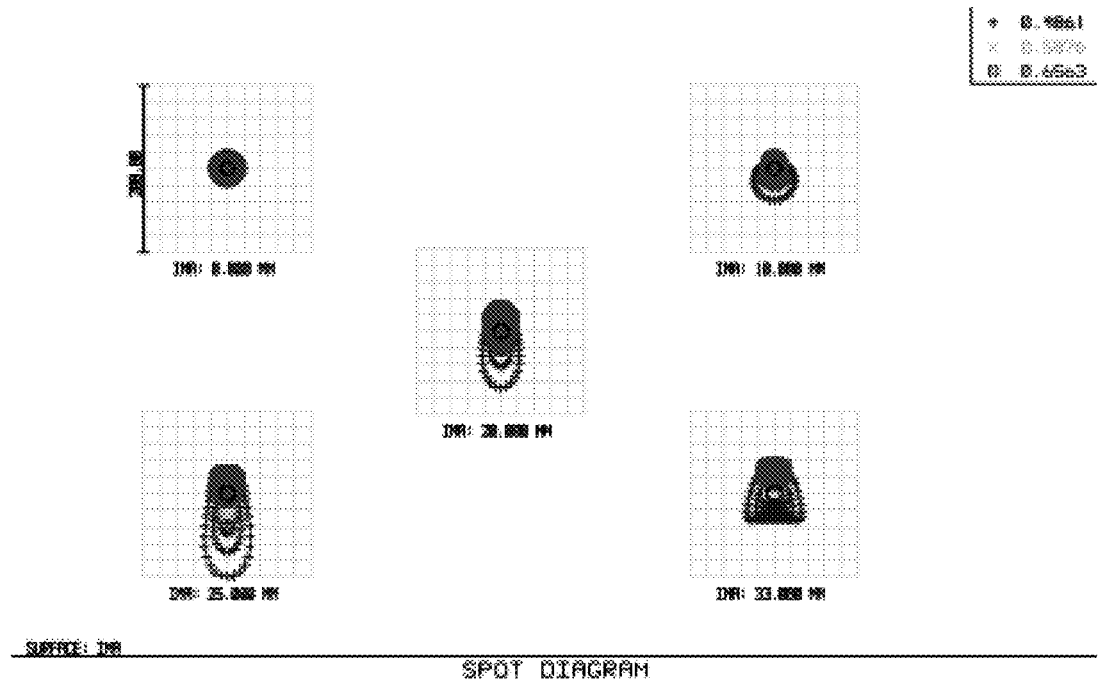

In the technical solutions of this Application, the blue edges of a virtual image will obviously occur if the magnification chromatic difference is not corrected, and the imaging definition will be seriously affected if the field curvature is not corrected FIG. 1 illustrates the structure diagram and the optical path diagram of a single lens structure. As to the structure as illustrated in FIG. 1, the point column diagram and the diagram of the magnification chromatic difference are illustrated in FIGS. 18 and 26, while the point column diagram and the diagram of the magnification chromatic difference after a correction using a minus lens are illustrated in FIGS. 17 and 25.

The point column diagram illustrates the defocused spots formed by the convergence of various viewing field lights of the optical system at the image surface, and thus it represents the aberration characteristics of the system. The system imaging quality is better when the RMS radius of the point column diagram is reduced. The gray scales in the diagram represent the lights of three wavebands. Thus, the chromatic difference of the system increases when the defocused spots of the three gray scales are more largely spaced from each other. However, as can be seen from FIG. 17, the chromatic difference has been well corrected. FIG. 18 is the point column diagram of a system with an uncorrected magnification chromatic difference, and the dispersion phenomenon is obvious. The RMS radius in FIG. 17 is far less than that in FIG. 18. For example in the maximum viewing field, the RMS radius in FIG. 17 is 18.428 micrometers, while that in FIG. 18 is 156.531 micrometers, which proves that various aberrations are corrected after the minus lens and the aspheric surface are introduced, and the system imaging quality is greatly improved.

Figure 25:
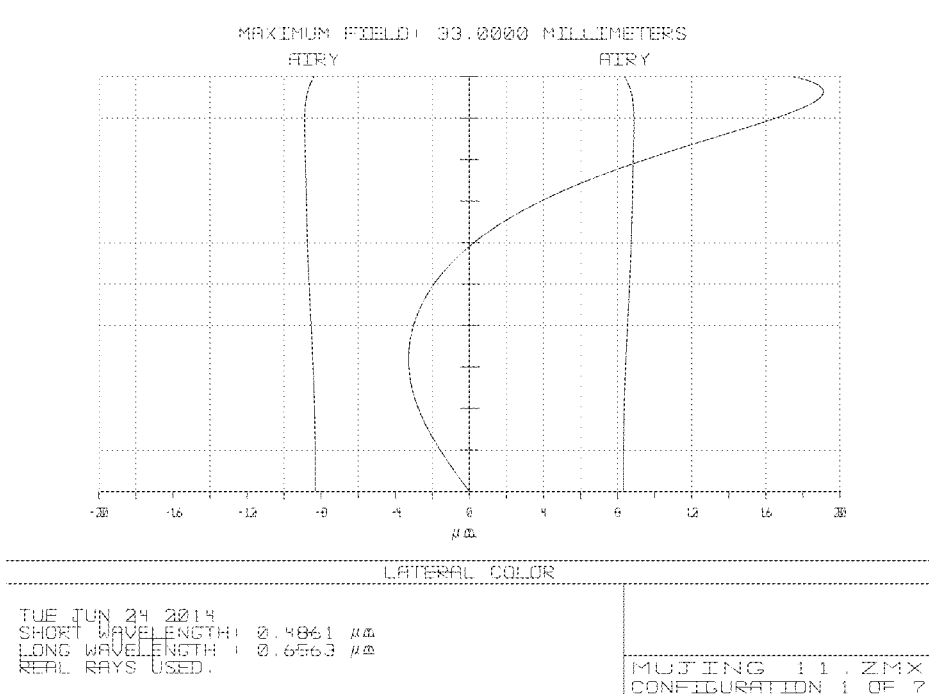
FIG. 25 is the diagram of the magnification chromatic difference of this Application.
Figure 26:
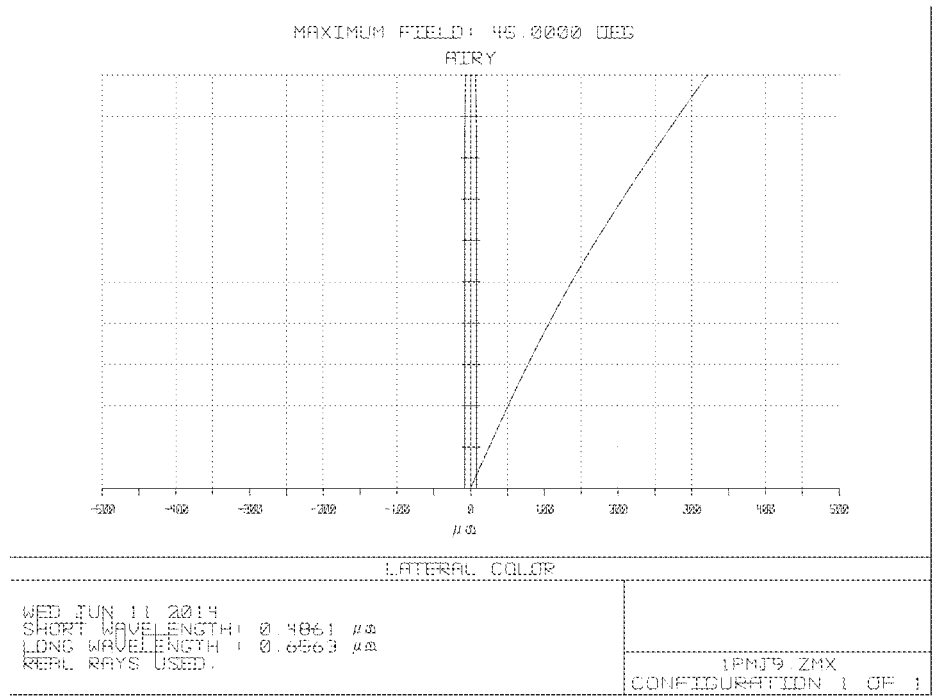
FIG. 26 is the diagram of the magnification chromatic difference for FIG. 1.

In the diagram of the magnification chromatic difference, the inclined curve represents the change of the magnification chromatic difference along with the enlarging of the viewing field, and the chromatic difference value represented by FIG. 25 (the system) is far less than that represented by FIG. 26 (the uncorrected chromatic difference). The maximum value of the magnification chromatic difference is slightly more than 20 micrometers in FIG. 25, but more than 300 micrometers in FIG. 26.

It can be known from the above that when two aberrations, i.e., the magnification chromatic difference and the field curvature, are corrected simultaneously, a combined structure of plus lens and minus lens is required, with the plus lens and the minus lens far away from each other. However, the aperture of the next minus lens will be increased if the distance between the plus lens and the minus lens is too large, while the correction effect of the field curvature will not be obvious if the distance is too small. Thus, the focal power shall be distributed based on formulas.

Since the diaphragm is prepositioned, the positive or negative compensation for the magnification chromatic difference is not concerned, and thus the magnification chromatic differences between various viewing fields can be considered as the positional chromatic differences of the chief light of those viewing fields, and the focal power can be calculated by the following chromatic difference correction formula:

$$c = \sum \frac{\varphi}{v} = \left(\frac{\varphi 1}{v1} + \frac{\varphi 2}{v2}\right)$$

wherein, c is a chromatic difference coefficient, v is a dispersion coefficient of the system, φ is the focal power of the system, v1 and v2 are dispersion coefficients of the respective lenses, and φ1 and φ2 are focal powers of the respective lenses.

Figure 16:
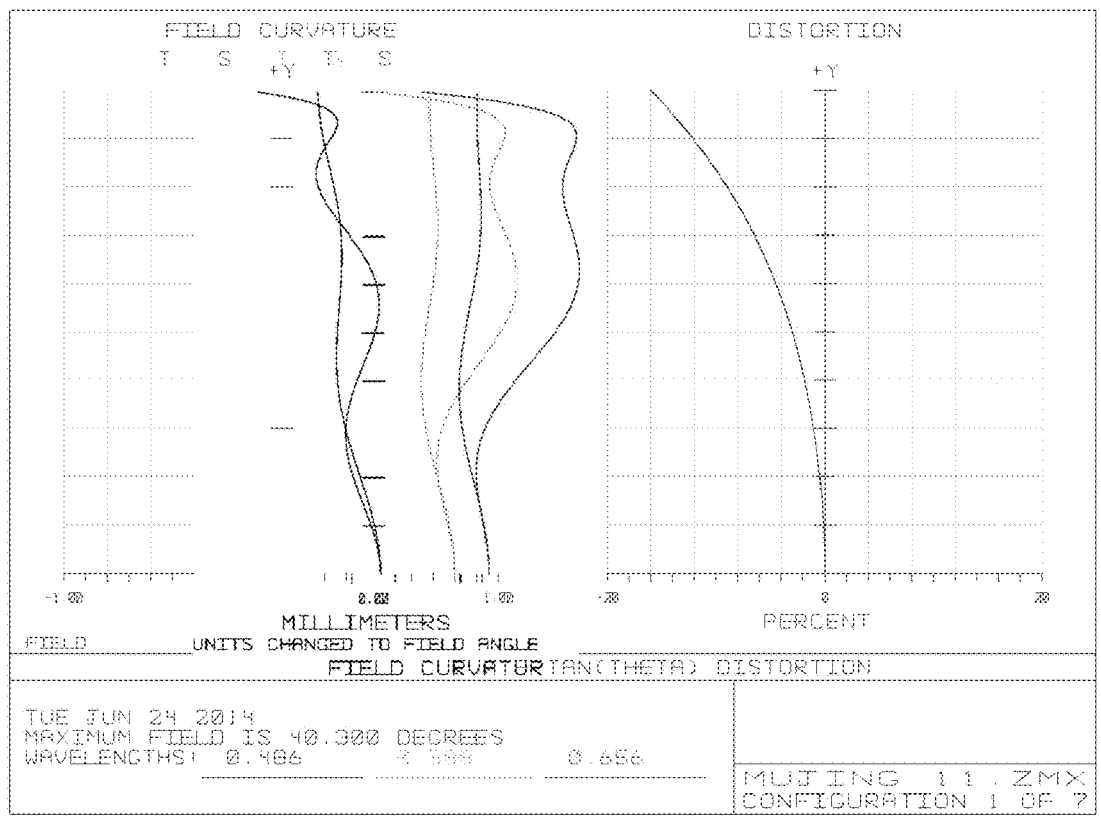
FIG. 16 illustrates the field curvature distortion diagram and the distortion curve diagram of this Application.

In the curves as illustrated in FIG. 16, the left ones are field curvature curves, and the right one is a distortion curve.

In the field curvature curves, curve T indicates a meridian field curvature, curve S indicates a sagittal field curvature, and the difference between them is the astigmatism of the system. The field curvature and the astigmatism are important aberrations influencing the light of the off-axis viewing field of the system, and will greatly influence the imaging quality of the off-axis light of the system if they are too large. As can be seen from the figure, the field curvature and the astigmatism of the system are both corrected into a very small range.

In the distortion curve, the distortion does not influence the system definition, but causes the image morphing of the system. The distortion can be solved by post image processing.

The system designed in the present application is an achromatic eyepiece with a large viewing field angle, and mainly applied to the fields such as head-mounted display devices. The system is more light-weighted by using plastic lenses and introducing the aspheric surface.

Next, this Application will be described in details with reference to the drawings and the embodiments.

Embodiment 1

This Application is a wide-angle camera for a head-mounted device, comprising a casing, a biconvex plus lens, and a biconcave minus lens, wherein the biconvex plus lens and the biconcave minus lens are arranged in parallel in the casing; the biconvex plus lens comprises a first surface that is convex toward the object space, and a second surface that has a flat edge and a center position that is convex toward an image space; the biconcave minus lens comprises a third surface that is concave toward the image space, and a fourth surface that has a flat edge and a center position that is concave toward the object space; and the third surface is an aspheric surface having an indefinitely large curvature radius.

The camera system of this Application adopts a very simple structure that is just composed of a plus lens and a minus lens, wherein the one that is closer to the human eyes is the plus lens and the one that is closer to the screen is the minus lens. The plus lens is a biconvex lens, and the minus lens is a biconcave lens. The four surfaces of the two lenses are all aspheric surfaces and easy to be machine-shaped, while the weights and the costs are very low, and thus they are suitable for mass productions.

The biconcave minus lens is able to move along an axis of the casing to adjust a distance to the biconvex plus lens.

The system compensates for defocus in a zooming manner, so that the crowds of nearsightedness or farsightedness can use the head-mounted device with naked eyes. In use, a person can adjust the focal length according to his degree of nearsightedness or farsightedness to achieve a clear imaging without changing the conjugated distance between the human eyes and the screen.

The working principle is as follows: the image surface of the system is the screen of the head-mounted device; a huge virtual image in a distance of 2.5 m to the human eyes is formed by the screen through by the eyepiece system, and then received by the human eyes; and the distance between the minus lens and the plus lens is changed by moving the minus lens, so as to change the focal length.

As shown in FIG. 27, the distance between the minus lens and the plus lens is changed by moving the minus lens, so as to simulate different focal lengths, and produce effects suitable for the crowds of different eyesight. In the table, the first row of data is used to simulate the focal length change of the ideal lens of nearsightedness or farsightedness, the second row of data indicates the distances between the minus lens and the plus lens at different focal lengths, and the third row of data indicates the distances from a second surface of the lens (i.e., the surface of the plus lens closest to the human eyes) to the image surface.

Figure 2:
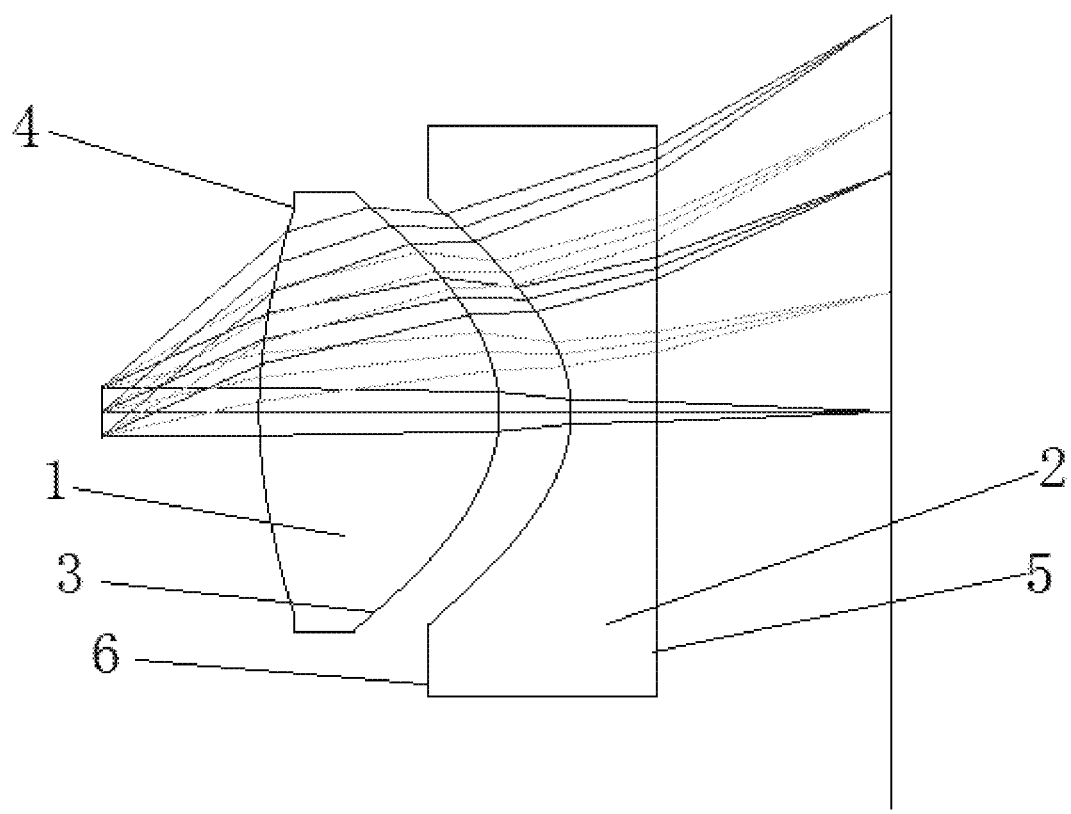
FIG. 2 illustrates the lens structure of the camera of this Application that is suitable for normal eyesight and the optical path diagram thereof.
Figure 3:
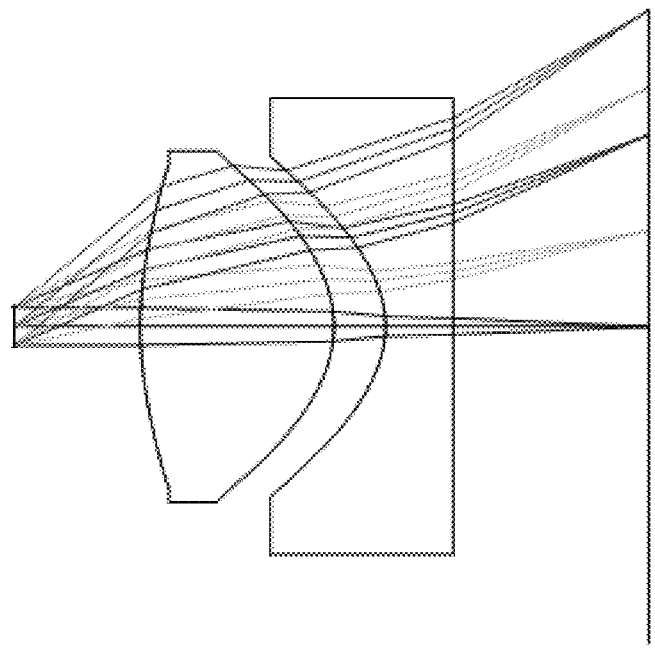
FIGS. 3-8 are the schematic structure diagrams of the present system at different focal lengths.
Figure 4:
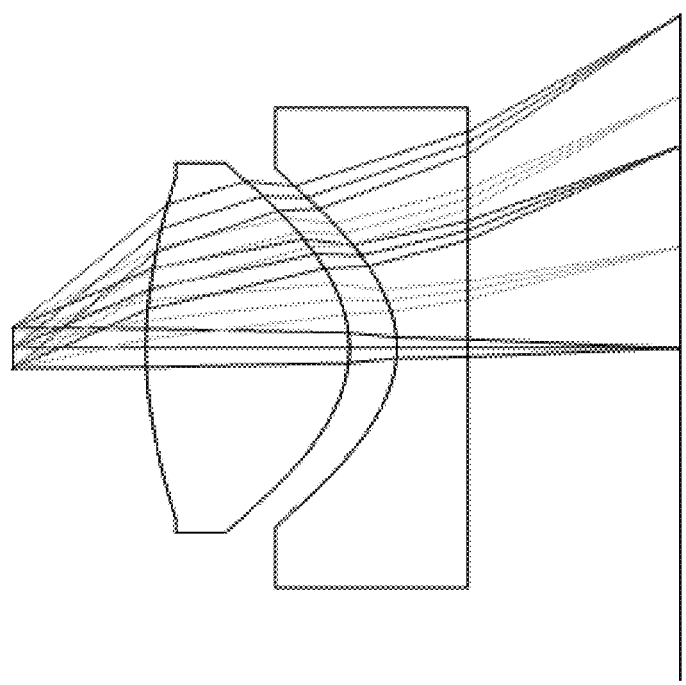
Figure 5:
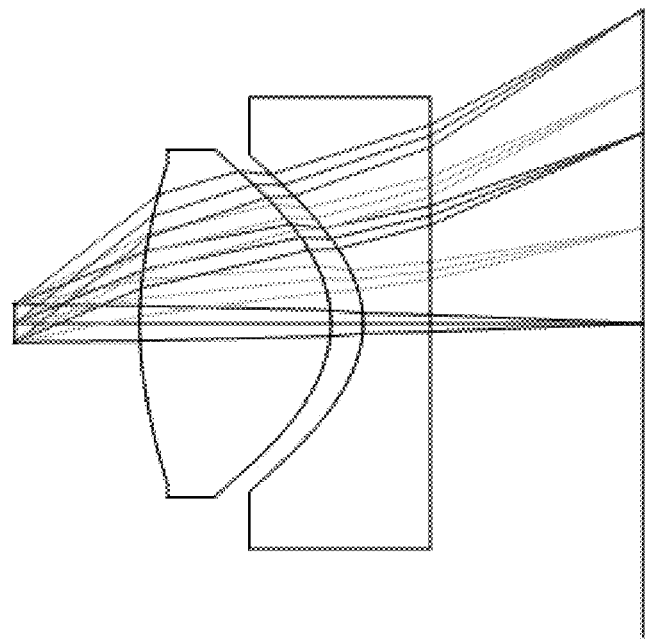
Figure 6:
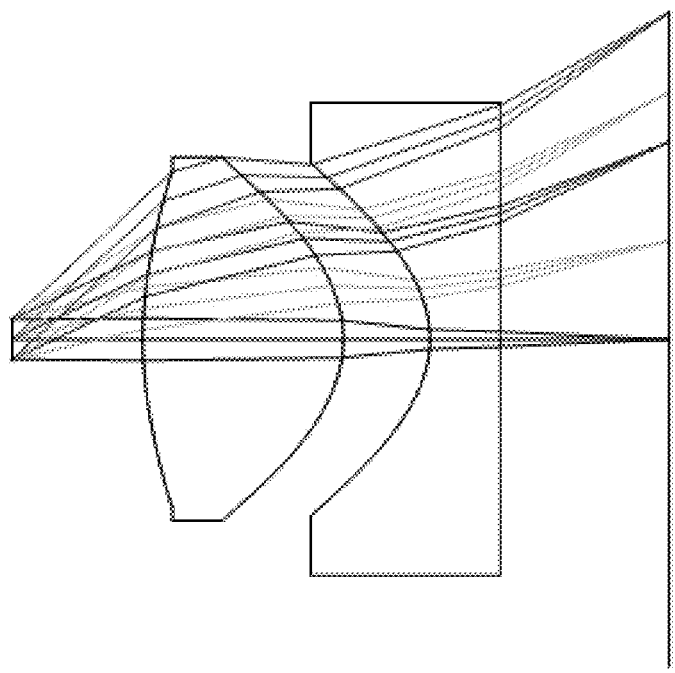
Figure 7:
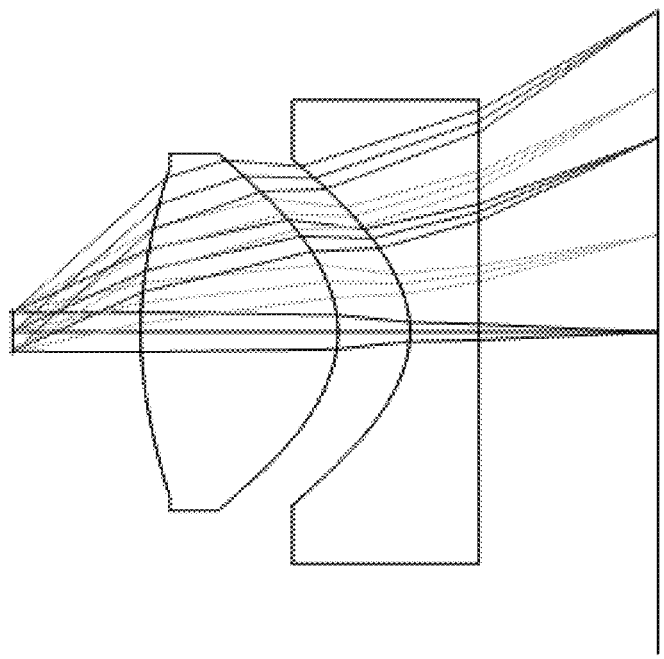
Figure 8:
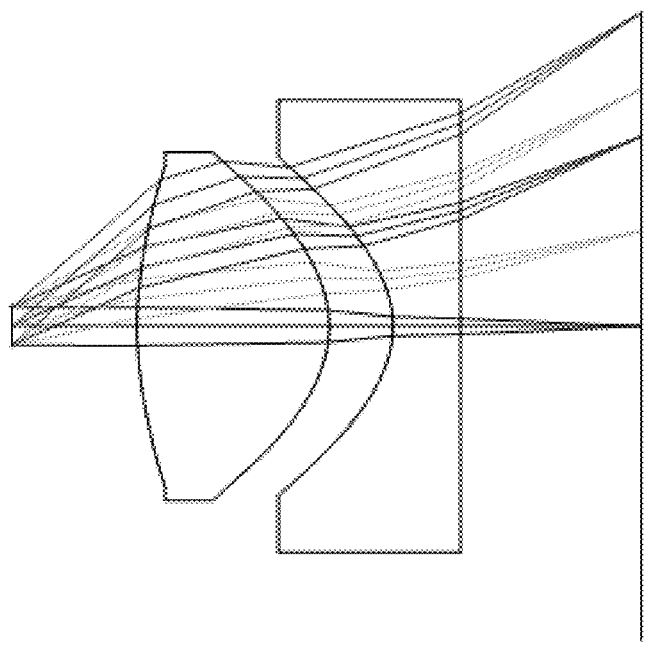
Figure 9:
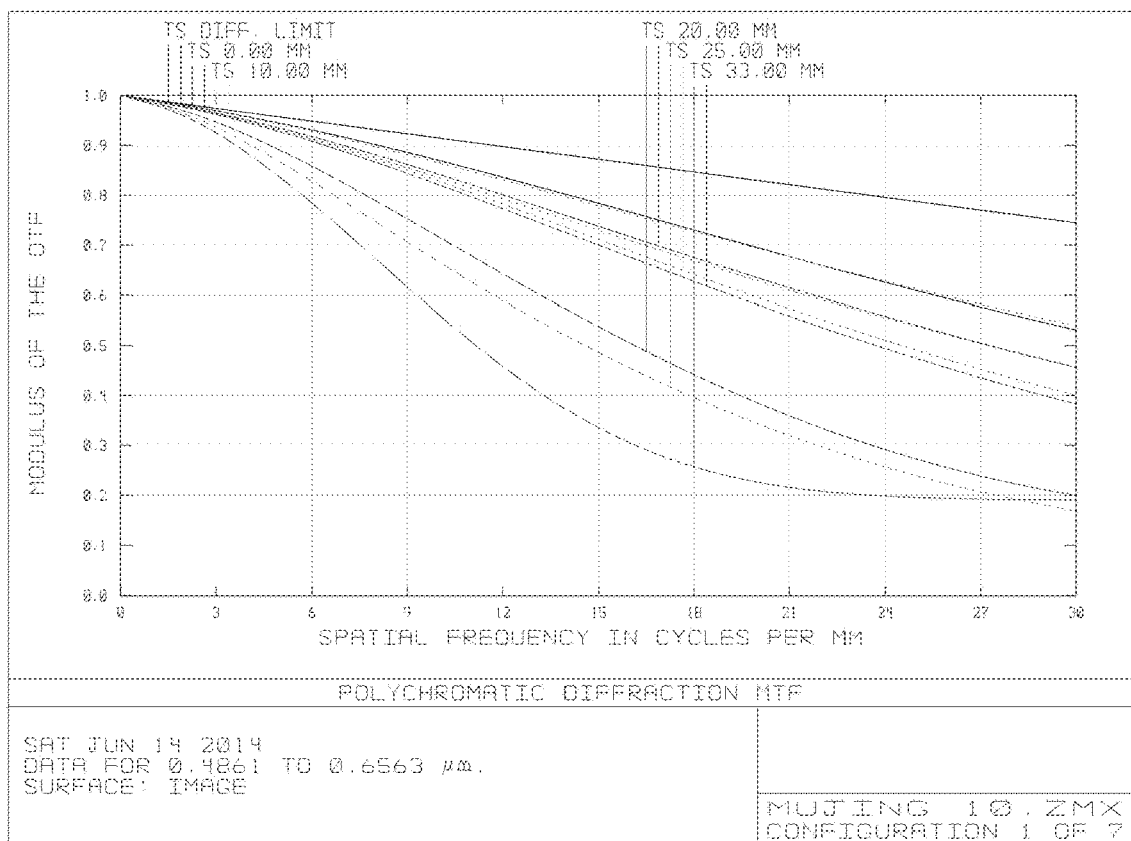
FIG. 9 is the Optical Transfer Function (MTF) diagram for 20 line pairs in FIG. 2.
Figure 10:
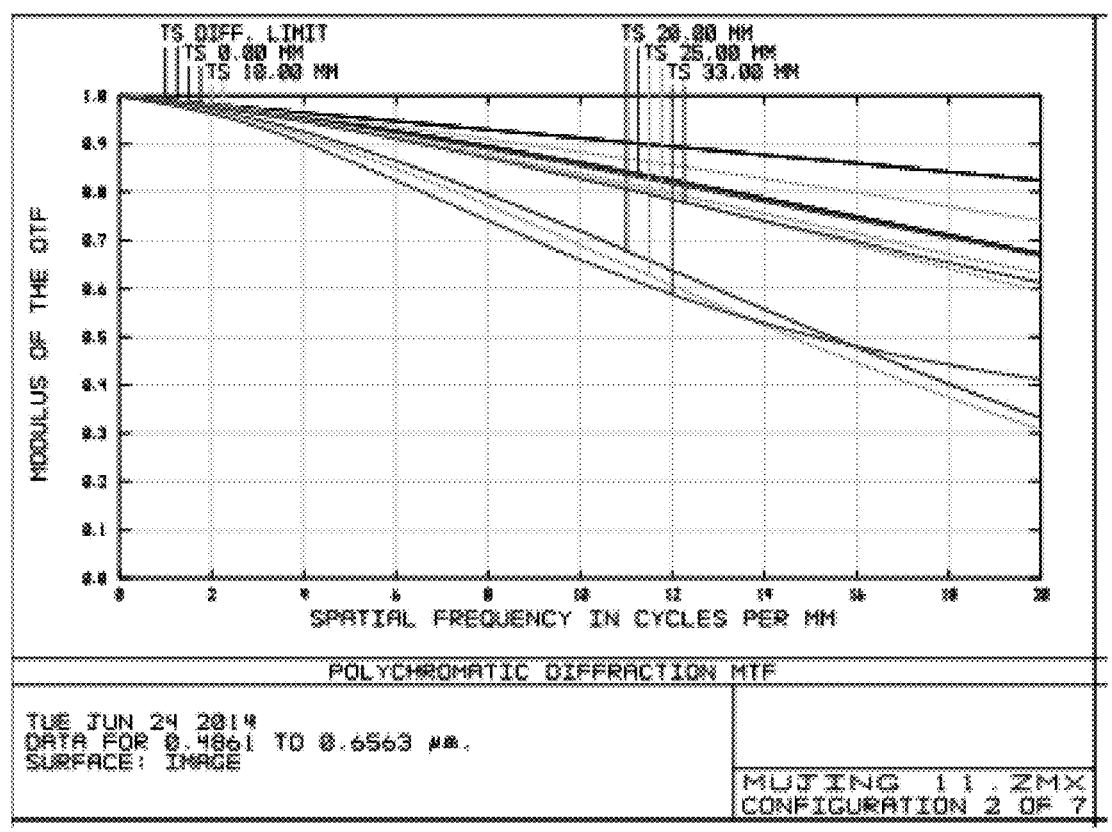
FIGS. 10-15 are the MTF diagrams for 20 line pairs one-to-one corresponding to the lens structures as illustrated in FIGS. 3-8.
Figure 11:
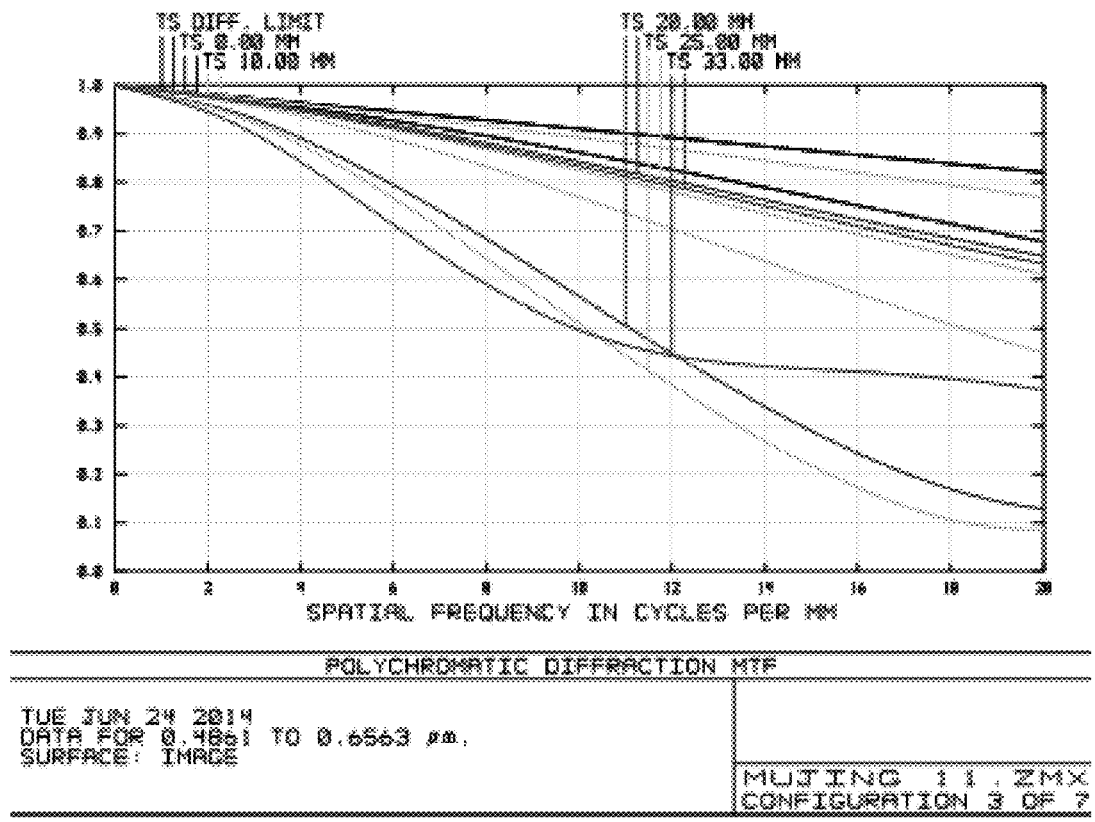
Figure 12:
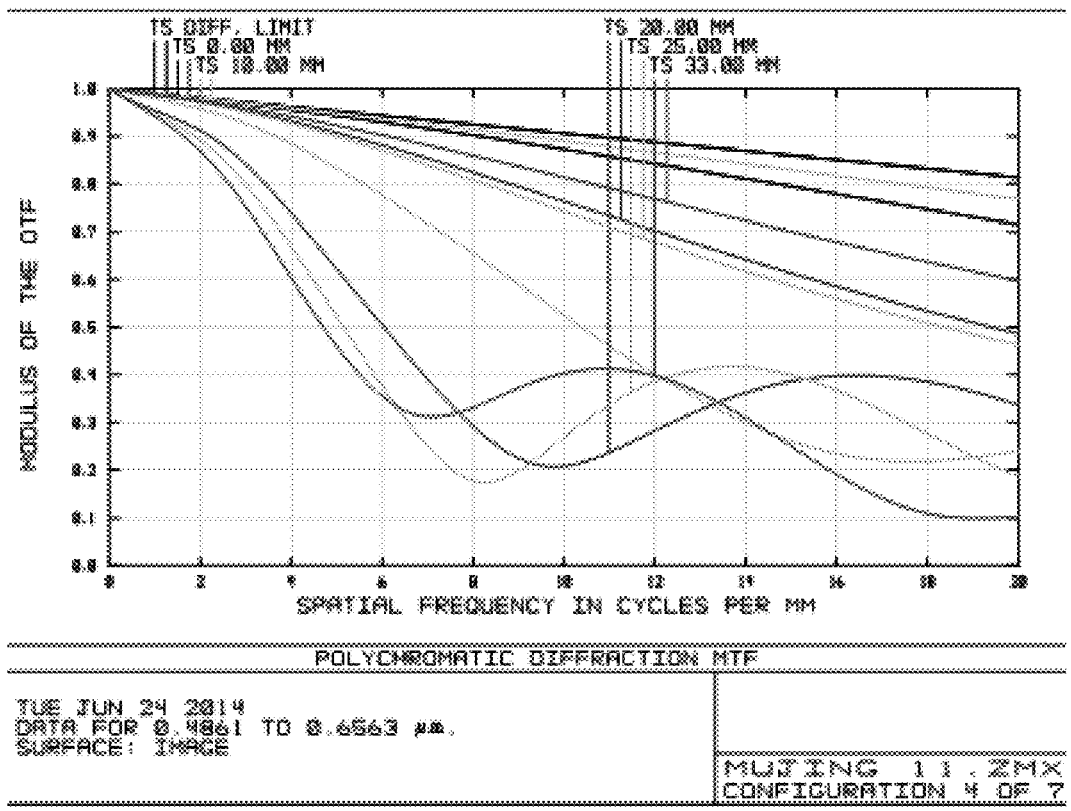
Figure 13:
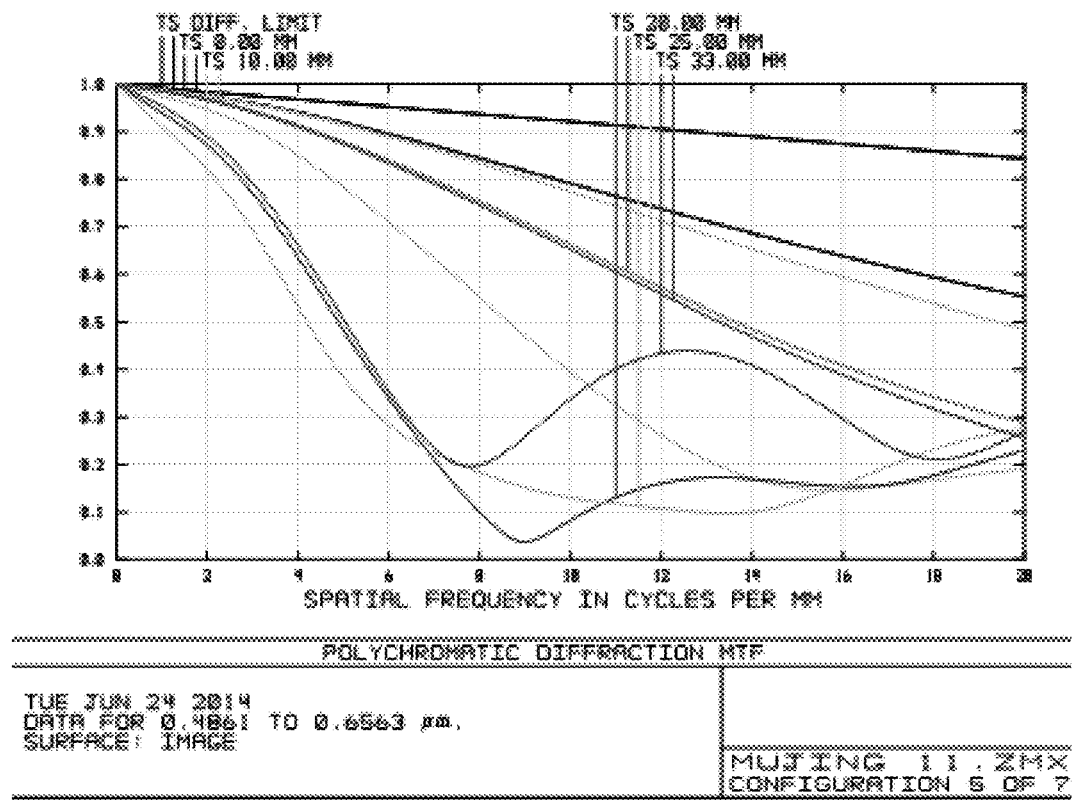
Figure 14:
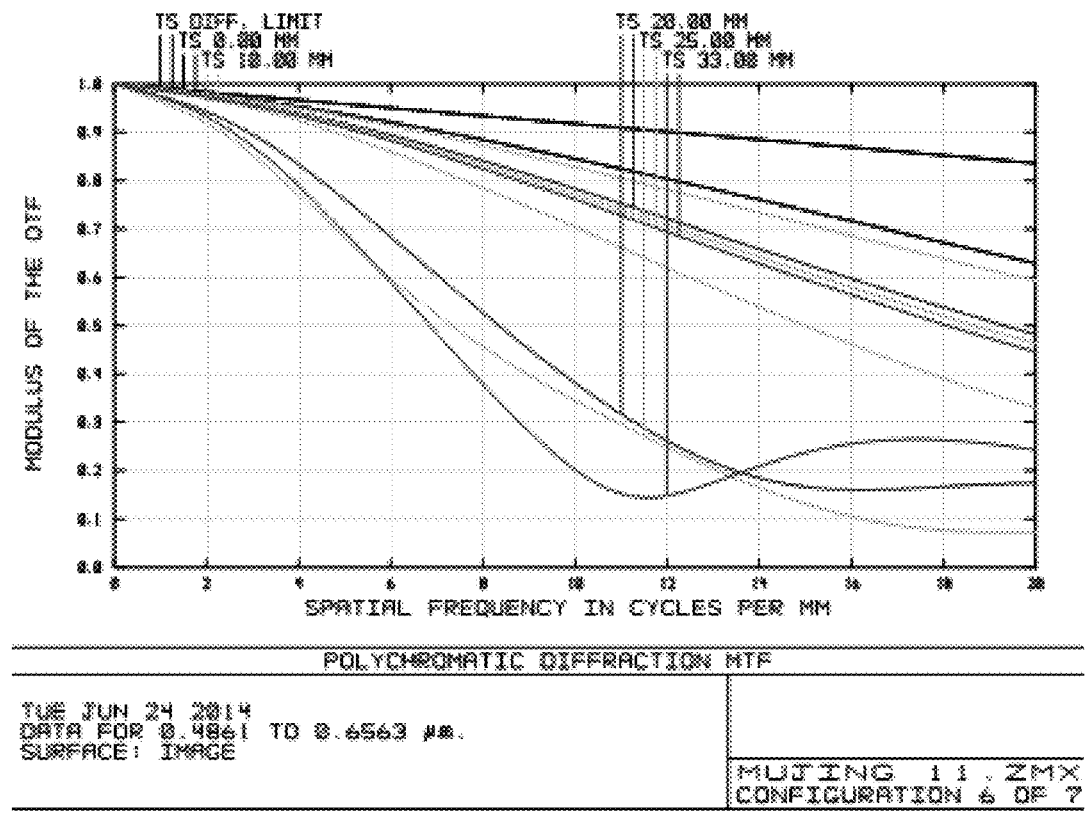
Figure 15:
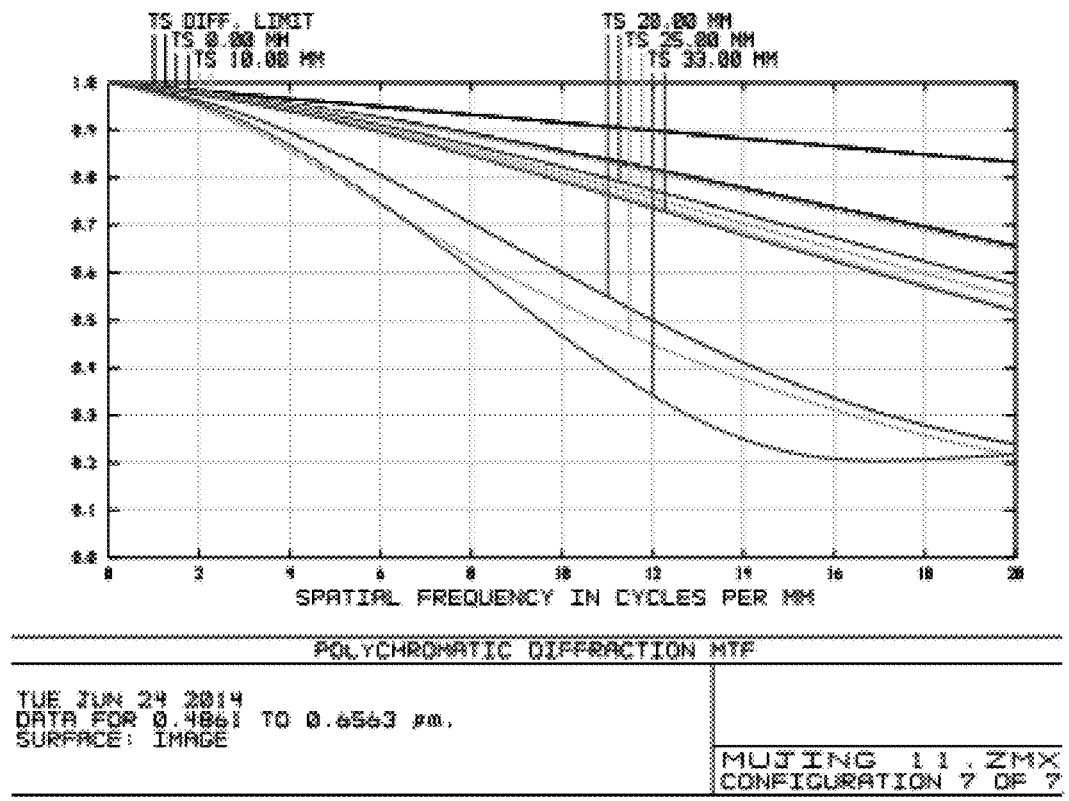

The system is designed with a backtracking optical path. In FIG. 1, the image surface position is a light-emitting screen, and the object surface position is a virtual image generated by the system. The wide-angle eyepiece comprises a biconvex plus lens, a biconcave minus lens and the light-emitting screen. In FIG. 2, the diaphragm position is the pupil of the human eye.

The system changes the focal length by moving the minus lens, and determines the reasonable moving paths of the two lenses by calculation. When the zooming system is designed, an ideal surface model is added at the diaphragm to simulate the changes of the human eyes caused by nearsightedness and farsightedness, and the ideal surface model has a focal power ranging from −0.005 to 0.005, representing the changes of the human eyes caused by 500 degree farsightedness to 500 degree nearsightedness. As shown in FIGS. 2-8, FIG. 2 illustrates the camera structure suitable for normal eyesight, and the distance between the two lenses illustrated is the distance when the focal power is adjusted to be zero. In that case, the distance is suitable for a user of normal eyesight. FIGS. 2-8 illustrate that the distance between the two lenses is adjusted differently to be suitable for the crowds of 500 degree nearsightedness and the crowds of 500 degree farsightedness.

The optical design of this Application ensures that the imaging performed by the system is clear at any focal length. The Modulation Transfer Function (MTF) curve graphs in FIGS. 9-15 can comprehensively reflect the imaging quality of the system, and the imaging quality increases when the curve shape is smoother and the height relative to axis X rises. The gray scales in the figures indicate respective viewing field lights, and the dotted and solid curves indicate the imaging qualities in the sagittal and the meridian directions. As can be seen from the figures, whether the focal power is 0, or at a different focal length, the curves are smooth and compact and the MIT values represented by the curves are high, which means that the system aberration is well corrected, and the imaging quality of the system can be ensured at various focal lengths.

In the point column diagrams as shown in FIGS. 19-24, the defocused spots at various focal lengths are compactly distributed, and the chromatic difference has been well corrected. The Root Mean Square (RMS) radius is controlled to be very small, which proves that various aberrations are corrected at different focal lengths, and the imaging quality of the system is ensured.

The biconvex plus lens has a refractive index ranging from 1.45-1.70, and a chromatic dispersion ranging from 50-75.

The biconcave minus lens has a refractive index ranging from 1.45-1.75, and a chromatic dispersion ranging from 25-40.

In the process of the lens adjustment, the solutions of this Application may design the total length of the camera to be constant or variable, which can be adaptively adjusted upon demand in the actual production to facilitate the design and usage.

The biconvex plus lens is made of an E48R plastic material, and the biconcave minus lens is made of a POLYCARB plastic material.

Since the biconvex plus lens has a relatively large chromatic dispersion value, the E48R plastic material is suitable to be selected. The E48R plastic material has a refractive index of 1.530 and a transmittance of 92%, and it is suitable to serve as a lens material of a large chromatic value. Since the biconcave minus lens has a relatively small chromatic dispersion value, the POLYCARB plastic material is suitable to be selected. The POLYCARB plastic material has a large refractive index and a light weight, which is helpful to reduce the entire product weight, and its high strength enables the finished camera product to have a better impact resistance. When it is placed in the image space closer to the human eyes, the risk of damage from the broken lens to the human eyes can be reduced when the camera is impacted.

The combination of the E48R plastic material and the POLYCARB plastic material is beneficial to the chromatic difference correction for the camera, so that the finished camera product has a small chromatic difference, and the color rendition is strong.

Embodiment 2

In this embodiment:
The lens surfaces of the biconvex plus lens and the biconcave minus lens are both aspheric surfaces.
The surface shapes of the first surface, the second surface, the third surface and the fourth surface follow a formula.

$$Z = \frac{cY^2}{1+\sqrt{1-(1+k)c^2Y^2}} + \sum_{i=1}^{N} \alpha_i Y^{2i}$$

wherein, Z is a coordinate in an optical axis direction, Y is a radial coordinate in the unit of a lens length unit, c is a curvature, k is a conical coefficient, $\alpha_i$ is a coefficient of each high order term, 2i is an aspheric high order power, and N is a natural number. In this embodiment, the third surface is made into an approximately planar shape for the optical path adjustment, so as to meet the design requirements.

In this embodiment, the biconvex plus lens has a refractive index of 1.45, and a chromatic dispersion of 50.

In this embodiment, the biconcave minus lens has a refractive index of 1.45, and a chromatic dispersion of 25.

In this embodiment, the focal length of the camera is adjusted to be suitable to be used by crowds of 500 degree farsightedness.

In this embodiment, the specific optical design software and design process for the wide-angle interior focusing camera for the head-mounted device are not limited.

Embodiment 3

In this embodiment:
The biconvex plus lens has a refractive index of 1.70, and a chromatic dispersion of 75.
The biconcave minus lens has a refractive index of 1.75, and a chromatic dispersion of 40.
In this embodiment, the focal length of the camera is adjusted to be suitable to be used by crowds of 500 degree nearsightedness.

Embodiment 4

In this embodiment:
The biconvex plus lens is made of an E48R plastic material, with optimal values of n1=1.531160 and v1=56.04.
The biconcave minus lens is made of a POLYCARB plastic material, with optimal values of n1=1.5585470 and v1=29.91.
In this embodiment, the focal length of the camera is adjusted to be suitable to be used by crowds of normal eyesight.

The above descriptions are merely preferred embodiments of this Application, rather than limitations to this Application. Any person skilled in the art can change or modify the disclosed technical contents into equivalent embodiments. However, any content that is not deviated from the technical solutions of this Application, as well as any simple amendment or any equivalent change and modification made to the above embodiments according to the technical essence of this Application, shall fall within the protection scope of the technical solutions of this Application.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:
1. A wide-angle camera for a head-mounted device, comprising:
   a casing,
   a biconvex plus lens, and
   a biconcave minus lens,
   wherein the biconvex plus lens and the biconcave minus lens are arranged in parallel in the casing and the biconcave minus lens is closer to an object space,
   wherein the biconcave minus lens is able to move along an axis of the casing to adjust a distance to the biconvex plus lens;
   wherein a focal power of a zooming system of the wide-angle camera is set to be a range from −0.005 to 0.005, and thus the biconvex plus lens is stationary in the wide-angle camera, and a movement of the bicon- cave minus lens enables the wide-angle camera to be suitable for users having nearsightedness between 0 and 500 degrees and users having farsightedness between 0 and 500 degrees.

2. The wide-angle camera for a head-mounted device according to claim 1, wherein the biconvex plus lens comprises a first surface that is convex toward the object space, and a second surface that has a flat edge and a center position that is convex toward an image space,
wherein the biconcave minus lens comprises a third surface that is concave toward the image space, and a fourth surface that has a flat edge and a center position that is concave toward the object space, and
wherein lens surfaces of the biconvex plus lens and the biconcave minus lens are both aspheric surfaces.

3. The wide-angle camera for a head-mounted device according to claim 2, wherein the third surface is an aspheric surface having an indefinitely large curvature radius.

4. The wide-angle camera for a head-mounted device according to claim 2, wherein surface shapes of the first surface, the second surface, the third surface and the fourth surface follow a formula:

$$Z = \frac{cY^2}{1 + \sqrt{1 - (1+k)c^2Y^2}} + \sum_{i=1}^{N} \alpha_i Y^{2i}$$

wherein, Z is a coordinate in an optical axis direction, Y is a radial coordinate in the unit of a lens length unit, c is a curvature, k is a conical coefficient, $\alpha_i$ is a coefficient of each high order term, 2i is an aspheric high order power, and N is a natural number.

5. The wide-angle camera for a head-mounted device according to claim 1, wherein the biconvex plus lens has a refractive index ranging from 1.45-1.70, and a chromatic dispersion ranging from 50-75.

6. The wide-angle camera for a head-mounted device according to claim 5, wherein the biconvex plus lens is made of a plastic material, with n1=1.531160 and v1=56.04, wherein n1 is a refractive index, and v1 is a chromatic dispersion.

7. The wide-angle camera for a head-mounted device according to claim 1, wherein the biconcave minus lens has a refractive index ranging from 1.45-1.75, and a chromatic dispersion ranging from 25-40.

8. The wide-angle camera for a head-mounted device according to claim 7, wherein the biconcave minus lens is made of a plastic material, with n1=1.5585470 and v1=29.91, wherein n1 is a refractive index, and v1 is a chromatic dispersion.

9. The wide-angle camera for a head-mounted device according to claim 1, wherein the focal power of the zooming system of the wide-angle camera is calculated in the following chromatic difference correction formula:

$$c = \sum \frac{\varphi}{v} = \left(\frac{\varphi 1}{v1} + \frac{\varphi 2}{v2}\right)$$

wherein, c is a chromatic difference coefficient, v is a dispersion coefficient of the system, $\varphi$ is the focal power of the system, v1 and v2 are dispersion coefficients of the respective lenses, and $\varphi 1$ and $\varphi 2$ are focal powers of the respective lenses.

10. A head-mounted device, comprising a wide-angle camera for a head-mounted device, the wide-angle camera for a head-mounted device, comprising:
a casing,
a biconvex plus lens, and
a biconcave minus lens,
wherein the biconvex plus lens and the biconcave minus lens are arranged in parallel in the casing and the biconcave minus lens is closer to an object space,
wherein the biconcave minus lens is able to move along an axis of the casing to adjust a distance to the biconvex plus lens;
wherein a focal power of a zooming system of the wide-angle camera is set to be a range from −0.005 to 0.005, and thus the biconvex plus lens is stationary in the wide-angle camera, and a movement of the biconcave minus lens enables the wide-angle camera to be suitable for users having nearsightedness between 0 and 500 degrees and users having farsightedness between 0 and 500 degrees.

11. The head-mounted device according to claim 10, wherein the biconvex plus lens comprises a first surface that is convex toward the object space, and a second surface that has a flat edge and a center position that is convex toward an image space,
wherein the biconcave minus lens comprises a third surface that is concave toward the image space, and a fourth surface that has a flat edge and a center position that is concave toward the object space, and
wherein lens surfaces of the biconvex plus lens and the biconcave minus lens are both aspheric surfaces.

12. The head-mounted device according to claim 11, wherein the third surface is an aspheric surface having an indefinitely large curvature radius.

13. The head-mounted device according to claim 11, wherein surface shapes of the first surface, the second surface, the third surface and the fourth surface follow a formula:

$$Z = \frac{cY^2}{1 + \sqrt{1 - (1+k)c^2Y^2}} + \sum_{i=1}^{N} \alpha_i Y^{2i}$$

wherein, Z is a coordinate in an optical axis direction, Y is a radial coordinate in the unit of a lens length unit, c is a curvature, k is a conical coefficient, $\alpha_i$ is a coefficient of each high order term, 2i is an aspheric high order power, and N is a natural number.

14. The head-mounted device according to claim 10, wherein the biconvex plus lens has a refractive index ranging from 1.45-1.70, and a chromatic dispersion ranging from 50-75.

15. The head-mounted device according to claim 14, wherein the biconvex plus lens is made of a plastic material, with n1=1.531160 and v1=56.04, wherein n1 is a refractive index, and v1 is a chromatic dispersion.

16. The head-mounted device according to claim 10, wherein the biconcave minus lens has a refractive index ranging from 1.45-1.75, and a chromatic dispersion ranging from 25-40.

17. The head-mounted device according to claim 16, wherein the biconcave minus lens is made of a plastic material, with n1=1.5585470 and v1=29.91, wherein n1 is a refractive index, and v1 is a chromatic dispersion.

18. The head-mounted device according to claim 10, wherein the focal power of the zooming system of the wide-angle camera is calculated in the following chromatic difference correction formula:

$$c = \sum \frac{\varphi}{v} = \left(\frac{\varphi 1}{v1} + \frac{\varphi 2}{v2}\right)$$

wherein, c is a chromatic difference coefficient, v is a dispersion coefficient of the system, φ is the focal power of the system, v1 and v2 are dispersion coefficients of the respective lenses, and φ1 and φ2 are focal powers of the respective lenses.

* * * * *